INVENTOR.
LOUIS K. H. PRENGER
BY
AGENT

Sept. 26, 1967  L. K. H. PRENGER  3,344,303
ELECTRIC INCANDESCENT LAMP HAVING TWO INCANDESCENT
BODIES WITH A REFLECTOR FOR EACH
Filed April 16, 1965  2 Sheets-Sheet 2

INVENTOR.
LOUIS K. H. PRENGER
BY
AGENT

United States Patent Office 3,344,303
Patented Sept. 26, 1967

3,344,303
ELECTRIC INCANDESCENT LAMP HAVING TWO INCANDESCENT BODIES WITH A REFLECTOR FOR EACH
Louis Karel Hubert Prenger, Emmasingel, Eindhoven, Netherlands, assignor to North American Philips Company, Inc., New York, N.Y., a corporation of Delaware
Filed Apr. 16, 1965, Ser. No. 448,599
Claims priority, application Netherlands, May 5, 1964, 64—4,941
3 Claims. (Cl. 313—114)

The invention relates to an electric incandescent lamp comprising a reflector connected herewith and formed by a body of revolution, and an incandescent body arranged in the axis of revolution of the reflector in such a position relative to the reflector that the light rays reflected thereby, emanating from the incandescent body, are concentrated in a beam.

By using these incandescent lamps a reflector or lens separated from the lamp, having a condenser effect on the emitted light, may be dispensed with. In the case of projection apparatus, this permits of designing a very compact construction thereof.

In general, it may be said that an incandescent body of larger size, particularly for projection purposes, brings about a diminution of the optical output, it being assumed that it is compared with an incandescent body designed for the same lifetime and the same power.

The invention has for its object to improve the optical output of the lamp, designed for the same lifetime and the same power.

In accordance with the invention one or more further incandescent bodies are arranged inside the bulb, said bodies cooperating with one or more further reflectors, connected with the lamp and formed by bodies of revolution, so that the reflected light rays emanating from at least one of the further incandescent bodies converge in the first incandescent body.

In this way the incandescent body is so to say split up into two or more smaller portions, at least two of which are smaller than the incandescent body considered not to be split up. If desired, one or more portions may serve only for raising the temperature of the first portions by means of the rays emitted thereby, so that the operational conditions of said incandescent bodies are improved.

Particularly with an incandescent lamp for projection purposes, the beam preferably converges outside the bulb at a distance of at the most 20 cms. from the nearest bulb wall.

The lamp may be provided with two hollow, reflecting bulb wall portions facing each other, one of which has a central window for the light.

The other incandescent bodies may be arranged in the space between the first incandescent body and the window of the lamp.

The incandescent bodies are preferably connected in series.

The invention will be described more fully with reference to the drawing.

in FIG. 4 the lamp is shown perspectively viewed from the front.

FIG. 5 is comparable with FIG. 1 and FIG. 6 is comparable with FIG. 3.

Figure 1:
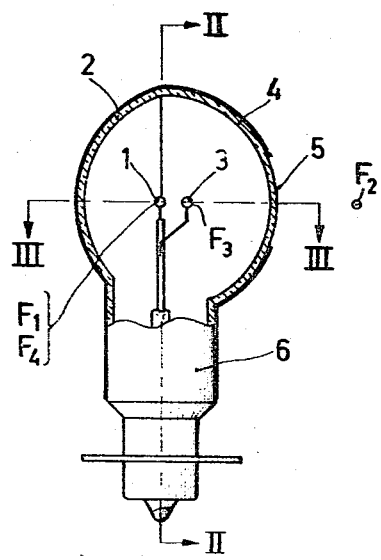
FIGS. 1 to 4 show one embodiment of the lamp according to the invention intended for use in a projection apparatus. The lamp is shown in FIGS. 1, 2 and 3 in a side view, a rear view and a plan view respectively, while the front bulb wall is partly cut away.
Figure 2:
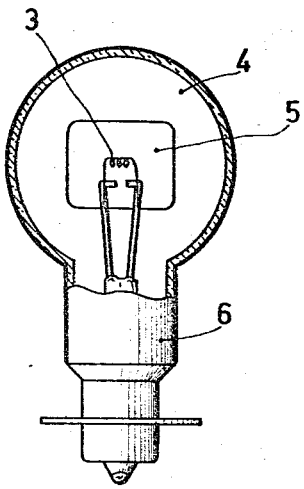
Figure 3:
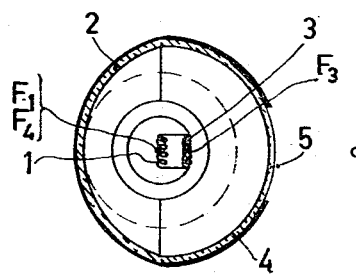
Figure 4:
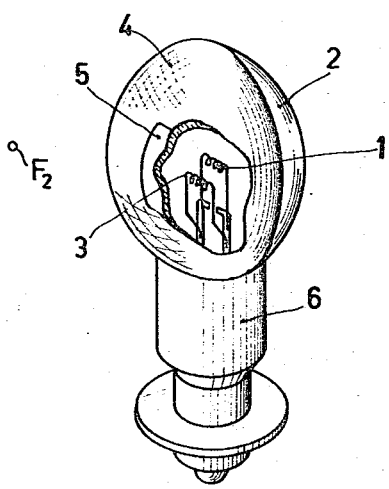

The lamp comprises an incandescent body 1, which is disposed at the focus $F_1$ of the reflective bulb wall portion 2, formed by an ellipsoid of revolution. Therefore the light rays emanating from the incandescent body 1 and reflected by the bulb wall portion 2 converge at the second focus $F_2$ of said ellipsoid, located outside the bulb.

According to the invention the lamp is provided inside the bulb with a second incandescent body 3, which is disposed at the focus $F_3$ of the reflective bulb wall portion 4, formed by an ellipsoid of revolution. The second focus $F_4$ of the ellipsoid 4 coincides with the focus $F_1$ of the first ellipsoid 2, so that the light rays emanating from the second incandescent body and reflected by the ellipsoid 4 converge in the first incandescent body 1.

By using two smaller incandescent bodies instead of one larger body considered not to be split up, the optical output of the lamp with the same lifetime and the same power is improved.

The bulb wall portion located between the foci $F_1$ and $F_2$ of the first ellipsoid is provided with a window 5 for the light and the lamp is provided with a foot 6.

Figure 5:
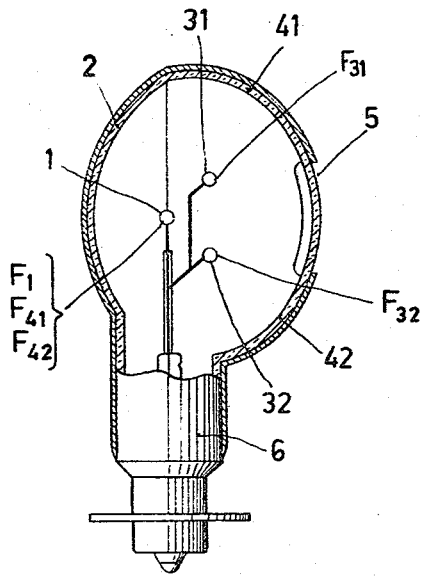
FIGS. 5 and 6 show another embodiment of the lamp according to the invention.

The lamp shown in FIGS. 1 to 4 has two incandescent bodies 1 and 3 and two reflectors 2 and 4. From FIG. 5, comparable with FIG. 1, it will be apparent that the ellipsoid 4 may be replaced by two ellipsoids 41 and 42, the foci $F_{41}$ and $F_{42}$ respectively of which coincide with the focus $F_1$ of the ellipsoid 2, while at the foci $F_{31}$ and $F_{32}$ respectively incandescent bodies 31 and 32 respectively are disposed.

As a matter of fact the ellipsoid 4 may be replaced by more than two ellipsoids, one focus of each of which coincides with the focus $F_1$ of the ellipsoid 2.

Figure 6:
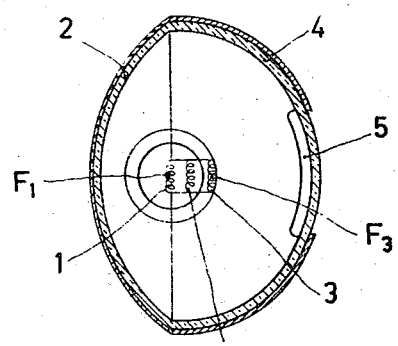

In the embodiment shown so far incandescent bodies are provided only at the foci of the reflectors located inside the bulb. From FIG. 6, which is comparable with FIG. 3, it will be seen, however, that one or more further incandescent bodies 7 may be arranged between the incandescent bodies 1 and 3 disposed at foci, the radiation emitted by said bodies raising the temperature of the incandescent bodies 1 and 3, so that the operational conditions of said incandescent bodies are improved.

The incandescent bodies of the embodiment shown in FIGS. 1 to 4 are shown in parallel connection. Of course, series combination of the incandescent bodies may be used, especially in those cases when the available A.C. voltage may be employed directly as a supply voltage for the lamp without the interposition of a matching transformer.

What is claimed is:

1. An electric incandescent lamp comprising two incandescent bodies, means mounting said incandescent bodies in spaced relationship within said lamp, a reflector in said lamp for each of said incandescent bodies and formed by a body of revolution, each of said incandescent bodies being disposed on the axis of revolution of said reflector in a position relative to said reflector such that said light rays reflected by said reflector and emanating from said incandescent body are concentrated in a beam, the reflected light rays emanating from at least one of the further incandescent bodies converging on said first incandescent body, said lamp being provided with two reflective bulb wall portions facing each other, and one of said bulb wall portions being provided with a central window for the light rays to exit.

2. An electric incandescent lamp as claimed in claim 1 wherein said lamp is a projection lamp and said beam converges outside the bulb at a distance 20 cms. at most from the closest portion of said lamp.

3. An electric incandescent lamp as claimed in claim 1 wherein said incandescent bodies are connected in series.

References Cited

UNITED STATES PATENTS

| | | | |
|---|---|---|---|
| 1,804,049 | 5/1931 | Claus | 313—115 |
| 3,174,067 | 3/1965 | Bahrs | 313—110 |

FOREIGN PATENTS 433,787  8/1935  Great Britain.

JAMES W. LAWRENCE, *Primary Examiner.*

R. JUDD, *Assistant Examiner.*